F. W. PETERS.
UNIVERSAL JOINT.
APPLICATION FILED MAR. 10, 1919.
1,364,311.
Patented Jan. 4, 1921.
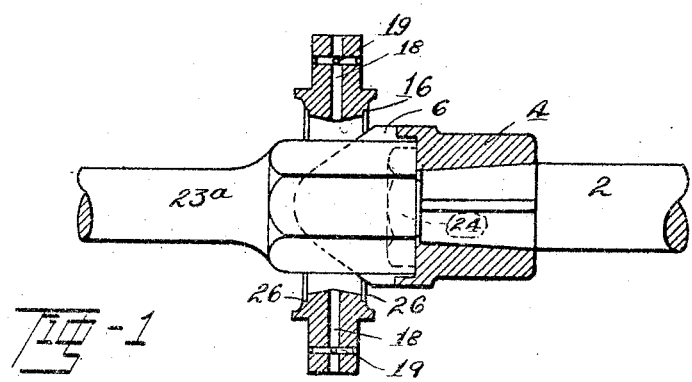
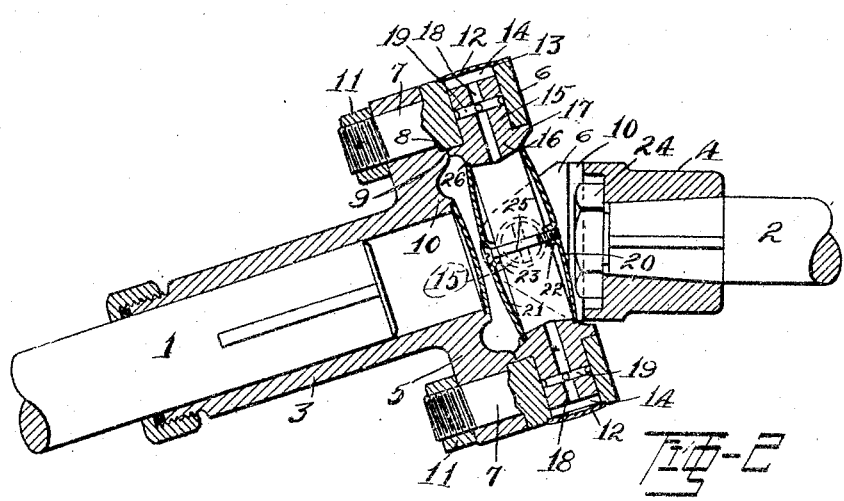
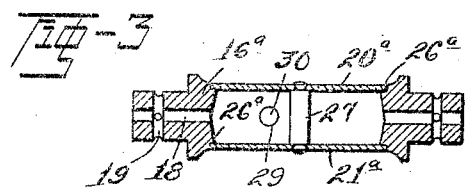
Inventor
Frederick W. Peters
By Hull, Smith, Brock & West
Attys.

UNITED STATES PATENT OFFICE.

FREDERICK W. PETERS, OF WEST PARK, OHIO, ASSIGNOR TO THE PETERS MACHINE AND MANUFACTURING COMPANY, OF CLEVELAND, OHIO, A CORPORATION OF OHIO.

UNIVERSAL JOINT.

1,364,311. Specification of Letters Patent. Patented Jan. 4, 1921.

Application filed March 10, 1919. Serial No. 281,748.

*To all whom it may concern:*

Be it known that I, FREDERICK W. PETERS, a citizen of the United States, residing at West Park, in the county of Cuyahoga and State of Ohio, have invented certain new and useful Improvements in Universal Joints, of which the following is a full, clear, and exact description, reference being had to the accompanying drawings.

This invention relates to universal joints and has for its general object to provide a joint of this character which may be conveniently assembled, and especially in connection with a shaft section having a short, exposed end, as in the case of transmission shafts for certain makes of automobiles.

Where universal joints of the "cross" type are employed and the bearing blocks are secured to their flanges by means of studs or projections which extend therethrough, there may, and frequently will, be difficulty in obtaining the necessary room for setting up the nuts or otherwise applying to such studs or projections the means for securing the blocks to the flanges. By means of my invention, it is possible to ship the joint in partially assembled condition and to apply the same to the short exposed shaft section without encountering the difficulties referred to. One manner of accomplishing this result is shown in the drawings forming part hereof, wherein Figure 1 represents a sectional view through a portion of a joint constructed in accordance with my invention and illustrating the manner of securing one of the members thereof to a shaft section; Fig. 2 a similar view of the assembled joint; and Fig. 3 a sectional view of a modified form of the cross member.

Describing by reference characters the various parts illustrated herein, 1 and 2 denote the ends of the shaft sections to be united, and 3 and 4 the hubs, each hub being provided with flanges 5 adapted to support bearing blocks 6. The bearing blocks are shown as of the type claimed in my application No. 238,240 filed June 5, 1918, each bearing block having a stud 7 projecting through its flange and provided with a flat or straight wall 8 engaging a complementary wall 9 on a shoulder 10 of the flange, whereby the bearing block, when seated, is prevented from rotating. The bearing blocks are drawn to their seats by means of nuts 11 on the threaded ends thereof. Each bearing block is provided with a bore, the outer end whereof is closed by a "Welch plug" 12 sprung to its seat 13, thereby providing a lubricant distributing well 14 beyond the outer end of each trunnion 15 of the cross member.

The cross member comprises a solid ring 16 having shoulders 17 adapted to engage the bearing blocks. Each trunnion is shown as provided with a radial port 18 extending from the outer end thereof through the ring and with cross ports 19 intersecting the radial port and adapted to conduct lubricant through the bearing formed between each trunnion and the bore of the bearing block.

The parts thus far described are substantially the same as shown and described in my application No. 238,240.

As pointed out hereinbefore, these joints frequently have to be assembled upon shaft sections, the projecting end of one of which is frequently so short as to render the assembling operation extremely difficult. To obviate this objection and at the same time to permit the use of a joint of this character with such installation, the well for lubricant is provided between a pair of outwardly convex plates 20 and 21, one of said plates having an internally threaded hub 22 and the other plate having an aperture surrounded by a countersunk seat 23. With this arrangement, the joint may be shipped with the cross member and the short hub 4 connected, but with the plates 20 and 21 removed and disassembled. The operator can then slip the short hub section upon the short exposed end of the shaft section 2, insert a socket wrench 23ª through the open space within the ring, and thereby connect the hub 4 (with its flanges 5, bearing blocks 6, and the cross member) to the shaft section by merely setting up on the nut 24, which is threaded onto the reduced end of the shaft 2. The plates 20 and 21 may then be applied to the seats 26 on opposite sides of the ring 16 and secured together by means of a screw bolt 25. The plates referred to may be of the "Welch plug" type described and claimed in my prior application, in which case the screw bolt 25 will afford a convenient means for springing the peripheral portions of the plates to their seats 26 on opposite sides of the ring. After the hub 4 and the plates have been applied in the manner described, the bearing blocks for the hub 3 may be applied to their trunnions and the hub slipped along its shaft section 1 to bring the flanges 5 in operative relation to the studs 7 of said blocks, and the nuts may then be secured to the threaded end of said studs and the hub secured in place, the arrangement of the parts, when the joint is assembled, being shown in Fig. 2.

In Fig. 3 there is shown a modification of the cross member wherein the plates 20ª and 21ª are shown as connected by means of a rivet 27. This arrangement, however, is not as convenient for assembling the joint on the short shaft section as is the case with the construction shown in the preceding views. The plates 20ª and 21ª are also of the "Welch plug" type, being outwardly convex in their normal condition, but being sprung to their seats 26ª by pushing the centers inwardly or toward each other. The rivet 27 is employed as additional securing means, although the plates will ordinarily remain in position through the springing action.

The purpose of inclosing the space within the rings 16 and 16ª is to provide a central well for lubricant which, by centrifugal action, will be distributed through the radial ports in the trunnions to the external wells 14 and from said wells and the cross ports 19 to the journals provided for the trunnions within the bearing blocks. Each of the rings 16 and 16ª will be provided with a filling opening, as 29, for the insertion of lubricant into the central well, said opening being adapted to be closed by a removable plug, indicated at 30.

Having thus described my invention, what I claim is:—

1. The combination, with a shaft section, of a hub adapted to be slipped upon and secured to such shaft section and having trunnion bearings, a cross member comprising a ring having trunnions projecting therefrom, one pair of said trunnions being journaled in said bearings and said trunnions having ports for conducting lubricant from a well formed in part by said ring to the bearings in which the trunnions are journaled, plates adapted to coöperate with opposite sides of said ring to provide with the ring a well for lubricant, and means for connecting said plates.

2. The combination, with a shaft section, of a hub adapted to be slipped upon and secured to such shaft section and having trunnion bearings, a cross member comprising a ring having trunnions projecting therefrom, a pair of which are journaled in said bearing, said trunnions having ports for conducting lubricant from a well formed in part by said ring, seats on opposite sides of said ring, plates adapted to coöperate with said seats to provide with the ring a well for lubricant, and means for connecting the central portions of said plates.

3. The combination, with a pair of opposed shaft sections, one of said sections having a threaded end projecting toward the other, of a hub having bearings for trunnions, a nut coöperating with such threaded end of such shaft section for securing the hub thereto, a cross member comprising a ring having trunnions projecting therefrom, one pair of said trunnions being journaled in said bearings and said trunnions having ports for conducting lubricant from the interior of the ring to the journals, outwardly convex plates coöperating with opposed sides of said ring and adapted to provide therewith a lubricant chamber, a bolt for connecting the central portions of said plates, a second hub slidably mounted upon the other shaft section, bearing members for the other pair of trunnions on said cross member, and means for securing said members to the second hub.

4. The combination with a pair of opposed shaft sections, one of said sections having a threaded end projecting toward the other, of a hub having bearings for trunnions, a nut coöperating with the threaded end of such shaft section for securing the hub thereto, a cross member comprising a ring having trunnions projecting therefrom, one pair of said trunnions being journaled in said bearings and said trunnions having ports for conducting lubricant from the interior of the ring to the journals, outwardly convex plates coöperating with opposed sides of said ring and adapted to provide therewith a lubricant chamber, one of said plates having a central internally threaded hub and the other having an aperture alined with said hub, and countersunk adjacent to said aperture, a screw bolt for connecting said plates, a hub slidably mounted upon the end of the other shaft section, and bearing members for the other trunnions of said cross member detachably connected to said hub.

5. In a universal joint, the combination of a rotatable member having trunnions projecting therefrom and a central well having a recessed annular seat at each end thereof, a cover plate coöperating with and sprung within each seat, shaft members each having bearings for said trunnions, and means for conducting lubricant from said well to said bearings.

6. In a universal joint, the combination of a rotatable member having trunnions projecting therefrom and a central well having a recessed annular seat at each end thereof, a cover plate coöperating with and sprung within each seat, additional means for retaining the said plates within their respective seats, shaft members each having bearings for said trunnions, and means for conducting lubricant from said well to said bearings.

In testimony whereof I hereunto affix my signature.

FREDERICK W. PETERS.